United States Patent [19]
Mayer

[11] Patent Number: 5,070,690
[45] Date of Patent: Dec. 10, 1991

[54] MEANS AND METHOD FOR REDUCING DIFFERENTIAL PRESSURE LOADING IN AN AUGMENTED GAS TURBINE ENGINE

[75] Inventor: Jeffrey C. Mayer, Swampscott, Mass.

[73] Assignee: General Electric Company, Lynn, Mass.

[21] Appl. No.: 343,226

[22] Filed: Apr. 26, 1989

[51] Int. Cl.[5] .............................................. F02K 3/10
[52] U.S. Cl. ...................................... 60/261; 60/226.1
[58] Field of Search ...................... 60/261, 262, 226.1

[56] References Cited

U.S. PATENT DOCUMENTS

| | | | |
|---|---|---|---|
| 3,296,800 | 1/1967 | Keenan et al. | 60/261 |
| 3,374,631 | 3/1968 | Marks | 60/261 |
| 3,491,539 | 1/1970 | Mangum | 60/261 |
| 3,595,024 | 7/1971 | Friedrichshafen | 60/261 |
| 4,064,692 | 12/1977 | Johnson et al. | 60/261 |
| 4,085,583 | 4/1978 | Klees | 60/261 |
| 4,185,880 | 3/1979 | Markowski | 60/261 |
| 4,335,573 | 6/1982 | Wright | 60/261 |
| 4,813,229 | 3/1989 | Simmons | 60/204 |
| 4,833,881 | 5/1989 | Vdoviak et al. | 60/261 |

FOREIGN PATENT DOCUMENTS 1273017 5/1972 United Kingdom .

Primary Examiner—Louis J. Casaregola
Assistant Examiner—John A. Savio, III
Attorney, Agent, or Firm—Francis L. Conte; Jerome C. Squillaro; Nathan D. Herkamp

[57] ABSTRACT

Means and method are disclosed for reducing buckling loads across an afterburner combustion liner in an augmented gas turbine engine. Means for accelerating bypass cooling airflow and then decelerating the accelerated bypass airflow for creating pressure losses to provide reduced-pressure bypass airflow to a plenum surrounding the afterburner liner are disclosed. In a preferred embodiment, the bypass airflow is accelerated to a velocity greater than Mach 1 and is then decelerated to a velocity less than Mach 1 for incurring shock waves for generating pressure losses for reducing differential pressure acting across the liner.

12 Claims, 2 Drawing Sheets

MEANS AND METHOD FOR REDUCING DIFFERENTIAL PRESSURE LOADING IN AN AUGMENTED GAS TURBINE ENGINE

BACKGROUND OF THE INVENTION

The present invention relates generally to augmented turbofan engines and, more particularly, to means and method for reducing differential pressure loading across an afterburner liner in an augmented turbofan engine.

A conventional augmented turbofan engine includes a fan which provides a portion of fan air to a core engine for generating combustion exhaust qases. Surrounding the core engine is a bypass duct which receives another portion of the fan air which bypasses the core engine. An afterburner or augmentor is disposed downstream of the core engine and bypass duct and includes a combustion liner within which is received the core engine exhaust gases and a portion of the bypass duct airflow, which is mixed with fuel for combustion in the afterburner. The afterburner also includes an annular plenum surrounding the liner, which receives the remaining portion of the bypass duct airflow for cooling the afterburner, in particular, the liner thereof.

A mixer is disposed at a downstream end of the core engine for mixing the bypass airflow with the core engine exhaust gases at the downstream end, which defines a match plane where the bypass airflow and the core engine exhaust gases intersect.

These engines have a match plane pressure ratio defined as the ratio of bypass airflow total pressure to core engine exhaust gas static pressure at the match plane. Match plane pressure ratios vary over a range during the operation of an engine from minimum to maximum values. In an exemplary augmented turbofan engine, the match plane pressure ratio varies from a minimum value of about 1.04 to a maximum value of about 2.8 during engine operation. During engine reheat operation, i.e. during operation of the afterburner, the match plane pressure ratio has values within the range of about 1.04 to 1.5 for the exemplary engine. During dry or non-reheat operation of the engine, i.e. when the afterburner is not in operation, the match plane pressure ratio may approach 2.8.

Since the match plane pressure ratio is a correlation between pressure of the bypass airflow and Pressure of the core engine exhaust gas, it is also an indication of the differential pressure loading occurring across the afterburner liner. More specifically, the differential pressure loading occurs since the bypass airflow is channeled to the plenum on the radially outer surface of the liner and the core engine exhaust gases are channeled in the augmentor and are bounded by the radially inner surface of the liner.

In the exemplary augmented turbofan engine, the bypass airflow is channeled directly to the augmentor plenum without incurring any significant pressure loss. Pressure losses are undesirable, since they decrease the aerodynamic efficiency of the engine. However, in such an engine, differential pressure loading across the liner due to the difference in pressure between the bypass airflow in the plenum and the pressure of the core engine exhaust gases within the liner increases as match plane pressure ratios increase. Accordingly, maximum differential pressure acting across the liner occurs at the maximum match plane pressure ratio, which occurs in the engine dry operation.

A differential pressure loading is a buckling load for the liner, and for some augmented turbofan engine designs that load may be substantial and therefore requires appropriate structure for accommodating the load.

OBJECTS OF THE INVENTION

It is an object of the present invention to provide a new and improved gas turbine engine having means and a method for decreasing differential pressure loading across an afterburner liner.

It is another object of the present invention to provide a gas turbine engine having a predetermined pressure loss in the cooling air channeled to the afterburner liner for decreasing the differential pressure loading across the liner for reducing buckling loads applied to the liner.

It is another object of the present invention to provide a gas turbine engine having reduced differential pressure loading across the afterburner liner at high match plane pressure ratios without creating undesirable pressure losses at low match Plane pressure ratios.

SUMMARY OF THE INVENTION

The invention comprises a method and means for reducing buckling loads in an afterburner combustion liner by introducing predetermined pressure losses in bypass duct airflow channeled to the liner. The method includes the steps of accelerating the bypass airflow for providing accelerated bypass airflow to the afterburner and then decelerating the accelerated bypass airflow for creating pressure losses in the bypass airflow in the plenum for reducing differential pressure acting across the liner.

The invention also includes means for accelerating and decelerating the bypass airflow for creating pressure losses for reducing differential pressure acting across the afterburner liner.

BRIEF DESCRIPTION OF THE DRAWINGS

The novel features believed characteristic of the invention are set forth in the claims. The invention, in accordance with preferred embodiments, together with further objects and advantages thereof, is more particularly described in the following detail description taken in conjunction with the accompanying drawing in which:

DETAILED DESCRIPTION

Figure 1:
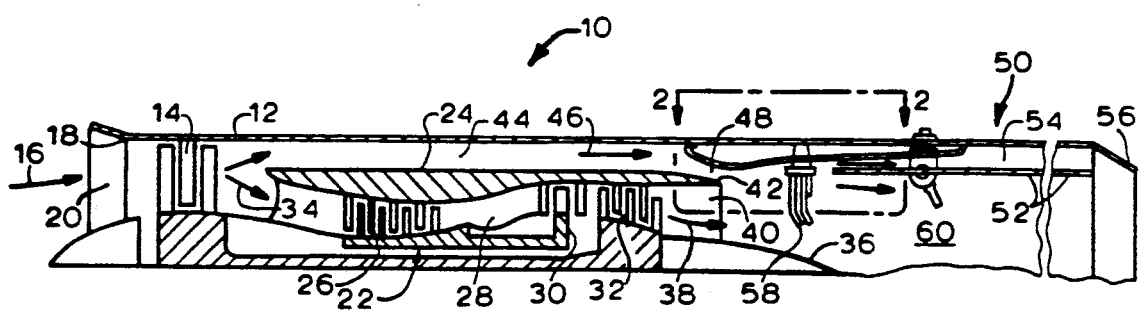
FIG. 1 is a cross-sectional view of an augmented mixed flow turbofan engine in accordance with one embodiment of the present invention.

Illustrated in FIG. 1 is a mixed flow turbofan gas turbine engine 10. The engine 10 includes an outer casing 12 in which is disposed a conventional fan 14 which receives ambient air 16 through an engine inlet 18 including a plurality of circumferentially spaced inlet guide vanes 20.

The engine 10 also includes a conventional core engine 22, which includes an annular casing 24 in which is disposed a compressor 26, a combustor 28 and a high pressure turbine 30, which drives the compressor 26. Core engine 22 also includes a low pressure turbine 32 which drives the fan 14.

In operation, the ambient air 16 is pressurized in the fan 14 and a first portion 34 of the fan air is channeled into the core engine 22 through the compressor 26, where it is compressed and then provided with fuel and burned in the combustor 28 for generating core engine exhaust gases 38. The gases 38 are channeled first through the high pressure turbine 30 for driving the compressor 26, and then through the low pressure turbine 32 for driving the fan 14, and then are discharged from the core engine 22 through an outlet 40 defined at a downstream end 42 of the core engine between the casing 24 and an exhaust cone 36 extending rearwardly from the turbine 32.

The core engine 22 is spaced radially inwardly from the outer casing 12 to define an annular bypass duct 44, which extends for the length of the core engine 22. A second portion of the air 16, which is pressurized by the fan 14, is channeled through the bypass duct 44 as bypass airflow 46, which bypasses the core engine 22 and is discharged from the bypass duct 44 through a bypass duct outlet 48 defined at the downstream end 42 of the core engine 22.

The engine 10 further includes an afterburner or augmentor 50 extending downstream from the core engine 22 and bypass duct 44 within the outer casing 12. The augmentor 50 includes a combustion liner 52, which is spaced radially inwardly of the outer casing 12 to define an annular plenum 54 extending for the length of the liner 52. The plenum 54 is in flow communication with the bypass duct 44 for receiving bypass airflow for cooling the augmentor including, in particular, for cooling the liner 52 and a conventional exhaust nozzle assembly 56 disposed at the aft end of the engine 10.

The augmentor 50 also includes a plurality of circumferentially spaced conventional fuel injectors 58 disposed between the core engine 22 and the augmentor liner 52, which provides fuel to the core engine exhaust gas 38 and the bypass airflow 46, which are channeled into a combustion zone 60 defined within the radially inner surface of the liner 52 for generating additional thrust during reheat operation of the engine 10 when the augmentor 50 is provided with fuel.

Figure 3:
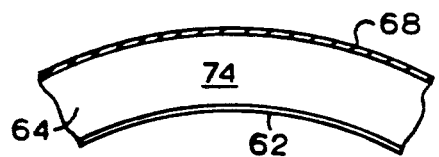
FIG. 3 is an end view taken along line 3—3 of FIG. 2.
Figure 2:
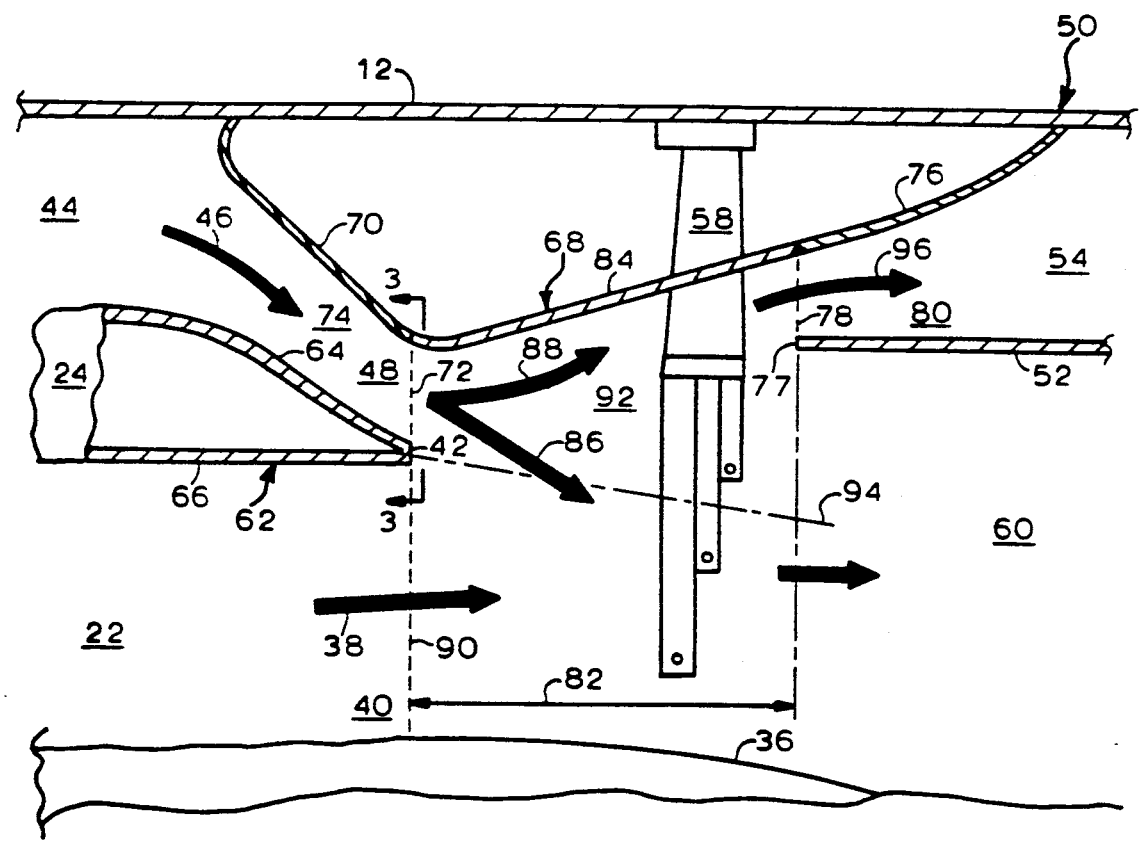
FIG. 2 is an enlarged view of the area designated 2—2 in FIG. 1 showing a preferred form of means for reducing differential pressure loads.

Illustrated in FIG. 2 is an enlarged portion of the region between the core engine 22 and the augmentor 50 showing, in more particularity, means for reducing differential pressure loading across the liner 52. Also illustrated in FIGS. 2 and 3 is an annular confluent mixer 62, which is formed by the aft end of the casing 24. More specifically, the mixer 62 is defined by an aft radially outer surface 64 of the casing 24, which bounds the bypass airflow 46 in the bypass duct 44. The mixer 62 also includes an aft radially inner surface 66 of the casing 24 which bounds the core engine exhaust gases 38. The outer and inner surfaces 64 and 66 converge to the downstream end 42 of the core engine 22, which may alternatively be referred to as the downstream end 42 of the mixer 62.

In accordance with a preferred embodiment of the present invention, the engine 10 includes an annular flow guide 68 extending radially inwardly from the outer casing 12 into both the bypass duct 44 and the plenum 54. The flow guide 68 includes a first portion 70 inclined rearwardly and radially inwardly from the outer casing 12 and spaced from and cooperating with the outer surface 64 of the mixer 62 for defining a throat 72 having minimum flow area at the bypass duct outlet 48 and a converging nozzle or channel 74 in the bypass duct 44 for accelerating the bypass airflow 46 in the converging channel 74 to the throat 72.

The flow guide 68 also includes a second portion 76 inclined in an upstream direction and radially inwardly from the outer casing 12, which is spaced from and cooperates with an upstream end 77 of the liner 52 for defining an inlet 78 to the plenum 54 and a first diverging channel 80 in the plenum 54 for diffusing the bypass airflow flowable into the inlet 78.

Alternatively, the flow guide second portion 76 may be truncated downstream of the inlet 78, and the channel 80 may converge or be a constant area channel, since it is believed that such portion 76 and channel 80 downstream of the inlet 78 do not significantly affect performance of the invention.

Also in the preferred embodiment, the mixer 62 is spaced axially from the plenum inlet 78 to define an axial gap 82. The flow guide 68 includes a third portion 84 extending between the flow guide first portion 70 at the throat 72 to the flow guide second portion 76 at the plenum inlet 78 for the axial extent of the axial gap 82.

With the structure provided above, the bypass airflow 46 is channeled through the bypass duct outlet 48 and is split into a bypass airflow first portion 86, which is channeled to the combustion zone 60 within the liner 52, and a bypass airflow second portion 88, which is channeled to the plenum 54 for cooling the augmentor 50. The mixer 62, which is disposed at the downstream end 42 of the core engine, is effective for mixing the exhaust gases 38 from the core engine outlet 40 and the bypass airflow first portion 86 from the bypass duct outlet 48. For the simple mixer 62 illustrated in FIG. 2, this is accomplished by the radially inwardly inclined outer surface 64, which is disposed obliquely to the inner surface 66 so that the bypass air first Portion 86 is channeled to intersect the core engine gases 38 in the axial gap 82 beginning at the downstream end 42 of the mixer 62.

As also illustrated in FIG. 2, the engine 10 further includes a match plane 90 defined as the plane extending through the core engine outlet 40, the mixer downstream end 42 and the bypass duct outlet 48. At the match plane 90 is defined a match plane pressure ratio comprising total pressure of the bypass airflow 46 at the match plane 90 divided by static pressure of the exhaust gases 38 at the match plane 90.

The engine 10 is operable over a range of match plane pressure ratios from minimum to maximum match plane pressure ratios, and for the exemplary embodiment illustrated range from a minimum match plane pressure ratio of about 1.04 to a maximum match plane pressure ratio of about 2.8. For reheat operation of the engine 10, in which fuel from the fuel injectors 58 is mixed with the core exhaust gases 38 and the bypass airflow first portion 86 and burned in the combustion zone 60, the match plane pressure ratio ranges from about 1.04 to about 1.5. During dry operation of the engine 10 when combustion does not occur in the combustion zone 60 of the augmentor 50, the match plane pressure ratios achieve the maximum value of about 2.8.

In accordance with a preferred embodiment of the invention, means are provided near the downstream end 42 of the core engine 22 for accelerating the bypass airflow 46, preferably to a velocity greater than Mach 1 at the maximum match plane pressure ratio, to provide accelerated bypass airflow to the augmentor 50. The accelerating means includes the converging channel 74 and the throat 72 defined by the flow guide first portion 70 cooperating with the outer surface 64 of the mixer 62 for accelerating the airflow 46 to velocities up to Mach 1 at the throat 72.

The accelerating means further comprises a second diverging channel 92 for further accelerating the bypass airflow 46 to supersonic velocities greater than Mach 1 for match plane pressure ratios greater than a sonic match plane pressure ratio. The sonic match plane pressure ratio is that pressure ratio which results in sonic flow at Mach 1 of the bypass airflow 46 in the throat 72, and for the exemplary embodiment illustrated is about 1.9. Also for the exemplary embodiment, the bypass airflow is accelerated in the diverging channel 92 to Mach 1.3 at the maximum match plane pressure ratio of 2.8.

The diverging channel 92 is defined by and is bounded on one side by the flow guide third portion 84 and on an opposite side by the exhaust cone 36 and extends the length of the axial gap 82. The diverging channel 92, including the flow guide third portion 84 and the axial gap 82, is sized and configured for further accelerating the bypass airflow 46 to supersonic velocities at above sonic match plane pressure ratios and decelerating the bypass airflow 46 at below sonic match plane pressure ratios. The length of the diverging channel 92, including the length of the axial gap 82, is selected for particular embodiments to ensure adequate expansion of the bypass airflow 46 in the channel 92 to obtain the supersonic velocities and the amount of divergence of the flow guide third portion 84 is also selected to provide the decelerated subsonic flow.

Accordingly, the accelerating means and the decelerating means both include the diverging channel 92 to accelerate or decelerate the bypass airflow second portion 88 at match plane pressure ratios which are supersonic or subsonic, respectively.

In the embodiment illustrated in FIG. 2, a fluid boundary 94 extends in the diverging channel 92 during supersonic flow from the downstream end 42 of the mixer 62 across the axial gap 82 to the liner 52. The fluid boundary 94 represents the interface between the bypass airflow 46 and the exhaust gases 38. The supersonic bypass airflow 46 described above will occur between the flow guide third portion 84 and the fluid boundary 94.

When the bypass airflow 46 is accelerated to a velocity greater than Mach 1 by the converging channel 74 and the diverging channel 92, the bypass airflow second portion 88 undergoes pressure losses and is channeled to the plenum inlet 78 at a velocity greater than Mach 1. The liner upstream end 77 will then generate shock waves in the bypass airflow second portion 88, which will create additional pressure losses therein to provide reduced-pressure bypass airflow 96 in the plenum 54 for reducing differential pressure acting across the liner 52.

In other words, the flow guide 68 and the axial gap 82 are provided as above described for introducing means for creating pressure losses in the bypass airflow 46 prior to being channeled to the plenum 54. The structures are preferably sized and configured at the maximum match plane pressure ratio condition to ensure the introduction of a maximum pressure loss in the bypass airflow second portion 88, which is channeled to the plenum 54. The maximum match plane pressure ratio, would, without the benefit of the invention, ordinarily result in a certain differential Pressure acting across the liner 52, with the Pressure of the airflow 96 being substantially greater than the pressure of the gases in the combustion zone 60 within the liner 52. The introduction of the predetermined pressure losses in the airflow 88 in accordance with the invention reduces the pressure within the plenum 54 for decreasing the differential pressure acting across the liner 52 and therefore decreasing buckling loads.

By sizing and configuring the flow guide 68 and the arial gap 82 for obtaining supersonic velocity of the bypass aizflow 46 downstream of the throat 72, substantial additional pressure losses will be generated by the shock waves occurring when the bypass airflow second portion 88 enters the inlet 78, Which is desirable for reducing the pressure differential across the liner 52. The design of converging-diverging (C-D) nozzles for obtaining supersonic flow is well known in the art, and is a function of pressure ratios and area ratios. The converging channel 74 and diverging channel 92 are directly analogous to conventional C-D nozzles, and the sizing and configuration for obtaining supersonic flow may be determined by those skilled in the art for each particular engine application.

At match plane pressure ratios below the maximum ratio of 2.8 for the embodiment illustrated, the velocity of the bypass airflow 46 in the diverging channel 92 will correspondingly decrease, and at the sonic match plane pressure ratio, the bypass airflow 46 will be accelerated to a maximum velocity of about Mach 1 at the throat 72. At lower values of the match plane pressure ratio, the bypass airflow 46 will be accelerated in the converging channel 74 to values less than Mach 1 at the throat 72, for example, Mach 0.24 at the minimum match plane pressure ratio of 1.04. And, the bypass airflow second portion 88 will be decelerated, instead of further accelerated, in the diverging channel 92. Such acceleration and deceleration of the bypass airflow 46 creates pressure losses preferred for the invention.

The preferred pressure losses introduced in the bypass airflow second portion 88 range from maximum values at the maximum match plane pressure ratios to substantial values, but lesser values, at match plane pressure ratios which result in the acceleration of the bypass airflow second portion 88 near but below Mach 1. The pressure losses further range to relatively low values at low match plane pressure ratios.

More specifically, the pressure losses introduced by the invention decrease substantially at relatively low Mach numbers of the bypass airflow second portion 88, which is preferable, since Pressure losses are ordinarily undesirable since they decrease engine efficiency and result in reduced airflow 96 into plenum 54 for cooling of the liner 52 at low Mach number conditions. For example, during reheat operation of the engine 10 with the match plane pressure ratios at the minimum and low values corresponding generally to about 1.04 to about 1.5 for the exemplary embodiment, the liner 52 is subjected to relatively low differential pressures and the need for reducing such differential pressures does not exist. The introduction of pressure losses would be undesirable during reheat operation since they decrease aerodynamic efficiency and reduce liner cooling of the engine. The invention, however, introduces relatively low pressure losses in the bypass airflow second portion 88 at the relatively low Mach numbers occurring during reheat operation. Therefore, the ability of the invention to provide relatively low pressure losses at low match plane pressure ratios while providing relatively high pressure losses at high match plane pressure ratios is desirable.

Figures 4, 5:
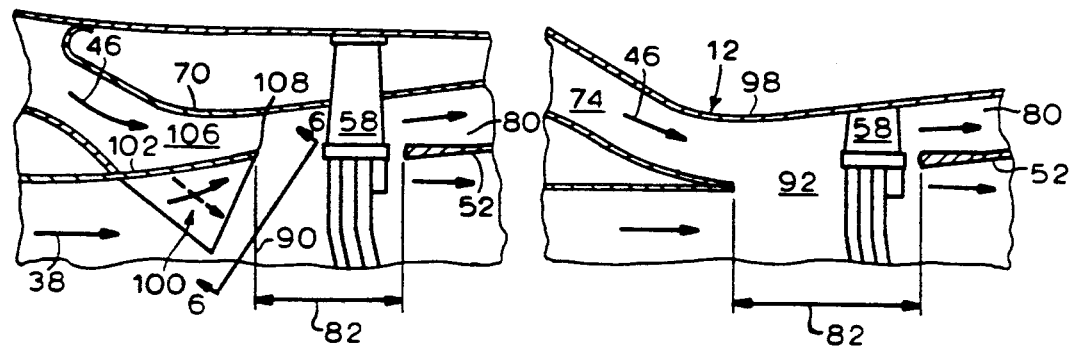
FIG. 4 is a view similar to FIG. 2, but showing another embodiment of the present invention having a flow guide formed by an engine casing.
FIG. 5 is a view similar to FIG. 2 but showing another embodiment of the present invention including a daisy mixer.

Illustrated in FIG. 4 is another embodiment of the present invention which is identical to the embodiment illustrated in FIG. 2 except that it includes a flow guide 98, which is identical to the flow guide 68 illustrated in FIG. 2 except that the flow guide 98 is formed as a portion of the outer casing 12 and not as an independent and distinct element.

Illustrated in FIG. 5 is another embodiment of the present invention which is substantially identical to the embodiment illustrated in FIG. 2 except that it includes a conventional daisy or lobed mixer 100 instead of the confluent mixer 62. As better seen in FIG. 6, the mixer 100 has a convoluted outer surface 102, which bounds on one side the bypass airflow 46, and also includes a convoluted inner surface 104, which bounds on one side the core engine exhaust gases 38. The lobed mixer 100 is conventional and operates in a conventional manner for mixing the bypass airflow 46 with the core exhaust gases 38. Just as in the embodiment illustrated in FIG. 2, the flow guide first portion 70 defines with the outer surface 102 of the mixer 100 a converging channel 106. The match plane is defined at the downstream end 108 of the mixer 100 and the axial gap 82 extends from the downstream end 108 to the liner 52.

Figure 7:
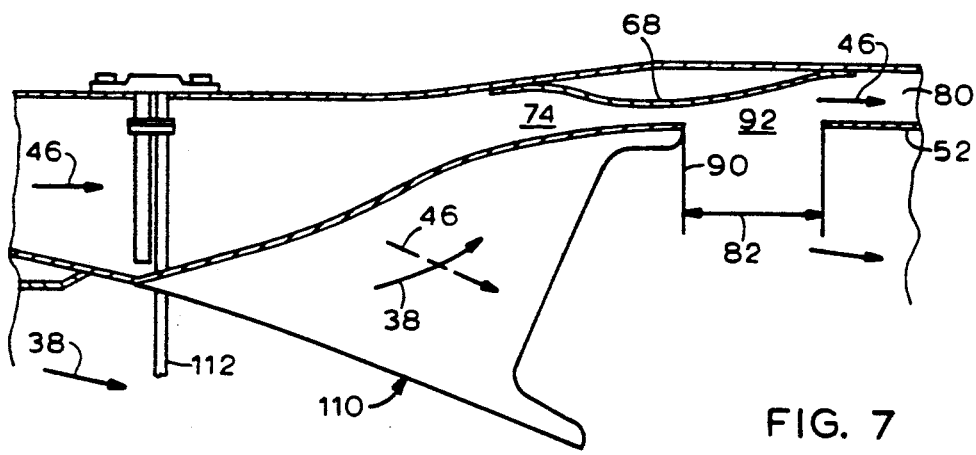
FIG. 7 is a view similar to FIGS. 2 and 5, but showing another embodiment of the present invention including a larger daisy mixer.
Figure 6:
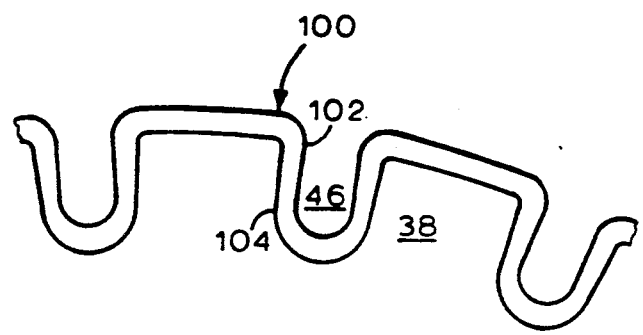
FIG. 6 is an end view taken along line 6—6 in FIG. 5.

Illustrated in FIG. 7 is another embodiment of the present invention which is substantially identical to the embodiment illustrated in FIGS. 5 and 6 except, however, it includes a substantially larger conventional daisy or lobed mixer 110 and a plurality of fuel injectors 112, which are disposed at an upstream end of the mixer 110.

Referring to FIG. 2, the invention also includes a method for increasing buckling resistance of the augmentor liner 52 of the engine 10 comprising the steps of:

accelerating the bypass airflow 46 for providing accelerated bypass airflow, i.e. the bypass airflow first and second portions 86 and 88, to the augmentor 50, and decelerating the accelerated bypass airflow, e.g. the bypass airflow second portion 88, for creating pressure losses to provide reduced-pressure bypass airflow 96 to the plenum 54 for reducing differential pressure acting across the liner 52.

The method also contemplates accelerating the bypass airflow 46 to a velocity greater than Mach 1 downstream of the throat 72 in the second diverging channel 92 during the acceleration step and then decelerating the accelerated bypass airflow, i.e. the bypass airflow second portion 88, to a velocity less than Mach 1 at the inlet 78 to the diverging channel 80 for obtaining pressure losses due, in part, to shock waves at the inlet 78.

While there have been described herein what are considered to be preferred embodiments of the present invention, other modifications of the invention shall be apparent to those skilled in the art from the teachings herein, and it is, therefore, desired to secure in the appended claims all such modifications as fall within the true spirit and scope of the invention.

I claim:

1. In a gas turbine engine having a fan, a core engine for generating combustion exhaust gases, a core outlet for discharging said exhaust gases, a bypass duct for channeling cooling bypass airflow from said fan and over said core engine, a duct outlet for discharging said bypass airflow, an augmentor including an annular combustion liner for receiving therein said exhaust gases and a first portion of said bypass airflow discharged from said duct outlet, and an annular plenum surrounding said liner and having an inlet spaced axially from said bypass duct outlet for receiving from said bypass duct outlet a second portion of said bypass airflow for cooling said augmentor liner comprising the steps of:

accelerating said bypass airflow discharged from said bypass duct outlet to a velocity greater than Mach 1 for providing accelerated bypass airflow to said augmentor; and decelerating said accelerated bypass airflow to a velocity less than Mach 1 at said plenum duct inlet for creating pressure losses due to shock waves in said bypass airflow second portion channeled to said plenum for reducing differential pressure acting across said liner.

2. A method according to claim 1 wherein said bypass airflow discharged from said bypass duct outlet is accelerated to a velocity greater than Mach 1 during said acceleration step at a maximum match plane pressure ratio of said bypass airflow and said exhaust gases defined at said bypass duct outlet, and said bypass airflow discharged from said bypass duct outlet is decelerated at a subsonic match plane pressure ratio of said bypass airflow and said exhaust gases defined at said bypass duct outlet.

3. A gas turbine engine comprising;

a fan;

a core engine for generating combustion exhaust gases, and having a core outlet for discharging said exhaust gases;

a bypass duct for channeling cooling bypass airflow from said fan and over said core engine, and having a duct outlet for discharging said bypass airflow;

a mixer disposed at a downstream end of said core engine for mixing said exhaust gases from said core outlet and said bypass airflow first portion from said duct outlet;

an augmentor including an annular combustion liner for receiving therein said exhaust gases from said core outlet and a first portion of said bypass airflow from said duct outlet, and an annular plenum surrounding said liner for receiving a second portion of said bypass airflow from said duct outlet for cooling said augmentor;

means for accelerating said bypass airflow to a velocity greater than Mach 1 for providing accelerated bypass airflow to said augmentor, said accelerating means including a flow guide having a first portion cooperating with said mixer for defining a throat at said duct outlet and a converging channel in said bypass duct for accelerating said bypass airflow in said duct for accelerating said bypass airflow in said converging channel to velocities up to Mach 1 at said throat, and a third portion extending downstream from said first portion for defining a third-portion diverging channel to accelerate said bypass airflow discharged from said throat to said velocity greater than Mach 1; and means for decelerating said accelerated bypass airflow to a velocity less than Mach 1 for creating pressure losses due to shock waves in said bypass airflow second portion channeled to said plenum for reducing differential pressure acting across said liner, said decelerating means including said liner having an upstream end defining with said flow guide an inlet to said plenum for generating said shock waves.

4. A gas turbine engine according to claim 3 wherein said accelerating means accelerate said bypass airflow discharged from said throat to a velocity greater than Mach 1 at a supersonic match plane pressure ratio of said bypass airflow and said exhaust gases, and decelerate said accelerated bypass airflow discharged from said throat at a subsonic match plane pressure ratio of said bypass airflow and said exhaust gases.

5. A gas turbine engine according to claim 3 wherein said flow guide has a second portion, with said third portion extending between said first and second portions, cooperating with said liner upstream end for defining said inlet to said plenum and a plenum diverging channel in said plenum.

6. A gas turbine engine according to claim 5 wherein said mixer is spaced axially from said plenum inlet to define an axial gap wherein said bypass airflow first portion joins with said exhaust gases for flow to said augmentor, and said flow guide third portion extends between said flow guide first portion at said mixer to said flow guide second portion at said plenum inlet for the axial extent of said gap.

7. A gas turbine engine according to claim 6 further including:
a match plane defined at a downstream end of said mixer at which match plane is defined a match plane pressure ratio comprising total pressure of said bypass airflow at said match plane divided by static pressure of said exhaust gases at said match plane, said engine being operable over a range of match plane pressure ratios from minimum to maximum match plane pressure ratios; and
said accelerating means being sized and configured for accelerating said bypass airflow to a velocity greater than Mach 1 at said maximum match plane pressure ratio.

8. A gas turbine engine according to claim 7 wherein said accelerating means and said decelerating means further comprise said flow guide third portion and said axial gap being sized and configured for defining said third-portion diverging channel to accelerate said bypass airflow to a velocity greater than Mach 1 for said match plane pressure ratios greater than a sonic match plane pressure ratio, and to decelerate said bypass airflow at match plane pressure ratios less than said sonic match plane pressure ratio.

9. A gas turbine engine according to claim 8 wherein said core engine includes an outer casing and said mixer comprises a confluent mixer defined by an aft radially outer surface of said casing bounding said bypass airflow and an aft radially inner surface of said casing bounding said core engine exhaust gases, said inner and outer surfaces converging to said mixer downstream end.

10. A gas turbine engine according to claim 8 wherein said mixer comprises a daisy mixer having a convoluted outer surface bounding said bypass airflow and a convoluted inner surface bounding said core engine exhaust gases.

11. A method according to claim 1 wherein said engine includes a bypass duct outlet for discharging said bypass airflow to said augmenter and said accelerating step further includes:
accelerating said bypass airflow to a velocity of Mach 1 at said bypass duct outlet; and
further accelerating said bypass airflow to a velocity greater than Mach 1 downstream of said bypass duct outlet for providing said accelerated bypass airflow.

12. A method according to claim 11 wherein said engine further includes:
a match plane defined at said bypass duct outlet at which match plane is defined a match plane pressure ratio comprising total pressure of said bypass airflow at said match plane divided by static pressure of said exhaust gases at said match plane, said engine being operable over a range of match plane pressure ratios from minimum to maximum match plane pressure ratios; and
said further accelerating step accelerates said bypass airflow to a velocity greater than Mach 1 at said maximum match plane pressure ratio.

* * * * *